United States Patent [19]
Latter

[11] 3,909,173
[45] Sept. 30, 1975

[54] INJECTION MOULDING MACHINE
[75] Inventor: Geoffrey Latter, Rexdale, Canada
[73] Assignee: A. C. Hamilton & Co., Mississauga, Canada
[22] Filed: Mar. 30, 1973
[21] Appl. No.: 346,683

[52] U.S. Cl. .............. 425/192; 425/247; 425/450.1
[51] Int. Cl.² ......................... B29F 1/00; B29F 1/02
[58] Field of Search ........ 425/190, 450 R, 192, 188, 425/183, 184, 242, 247, 246; 164/312, 313, 314

[56] References Cited
UNITED STATES PATENTS

| | | | |
|---|---|---|---|
| 3,086,244 | 4/1963 | Hehl | 425/244 |
| 3,564,658 | 2/1971 | Hehl | 425/192 X |
| 3,590,418 | 7/1971 | Hoeschel | 425/242 |
| 3,596,325 | 8/1971 | Hehl | 425/192 |
| 3,600,755 | 8/1971 | Cook | 425/242 |
| 3,720,492 | 3/1973 | Hehl | 425/242 X |

FOREIGN PATENTS OR APPLICATIONS
656,546    1963   Canada ............................. 425/190

Primary Examiner—Francis S. Husar
Assistant Examiner—Carl Rowold

[57] ABSTRACT

An improved injection moulding machine comprising a mould clamping assembly mounted on a frame and an injection assembly pivotally secured to the mould clamping assembly by vertical adjustment means such that the longitudinal axis of the injection assembly can be vertically adjusted relative to longitudinal axis of the clamping assembly when the said assemblies are arranged in parallel horizontal alignment or the longitudinal axis of the injection assembly can be axially vertically adjusted relative to the longitudinal axis of the injection assembly when the assemblies are arranged at right angles to each other.

7 Claims, 7 Drawing Figures

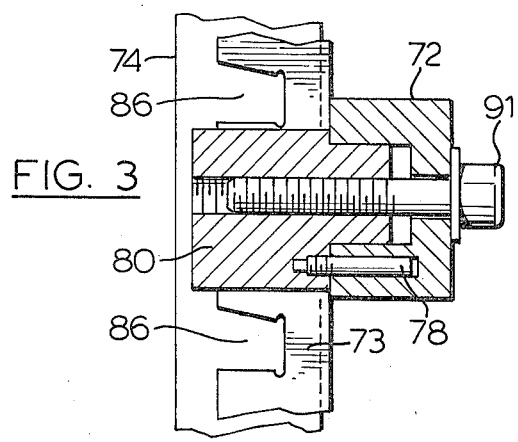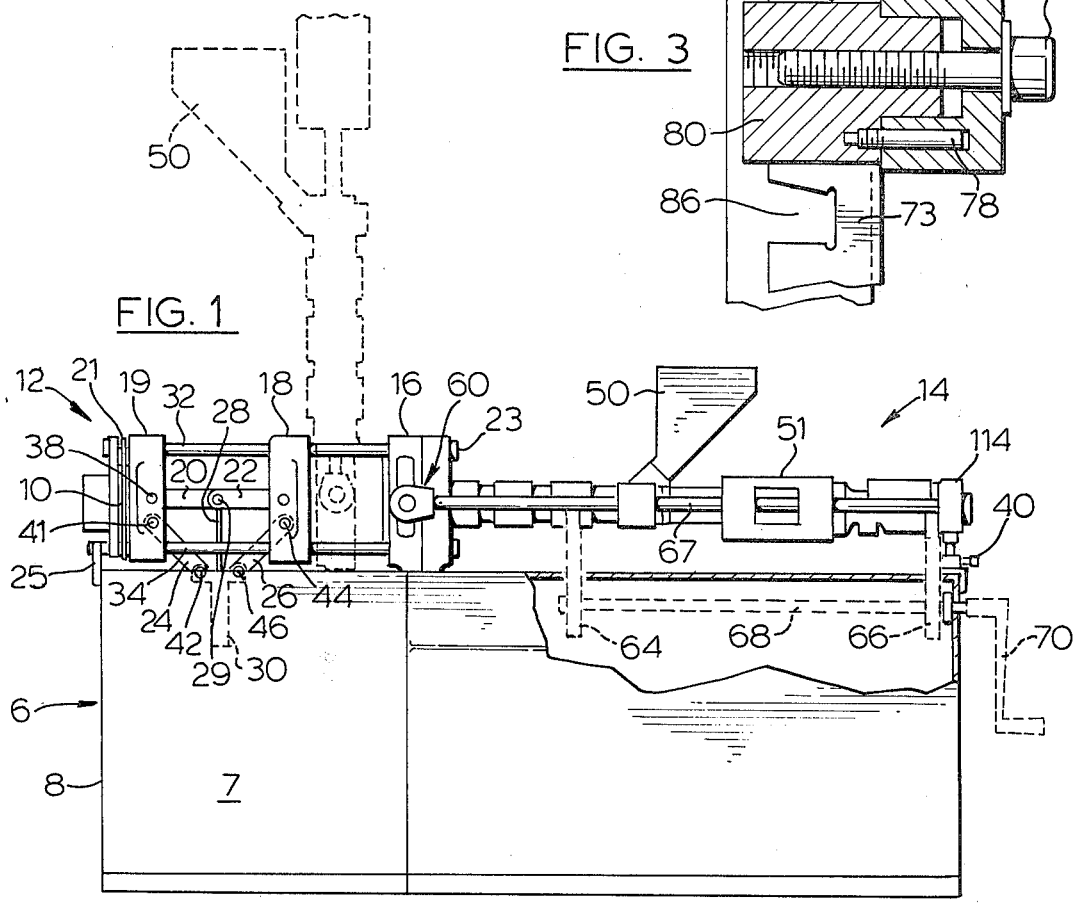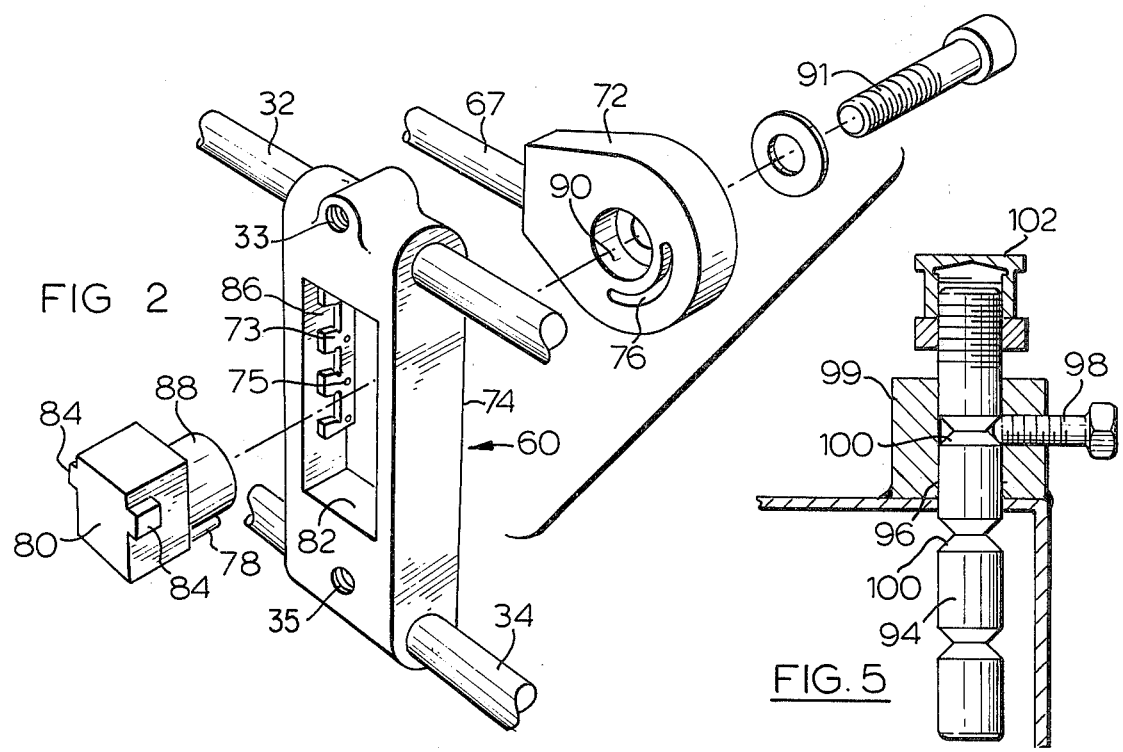

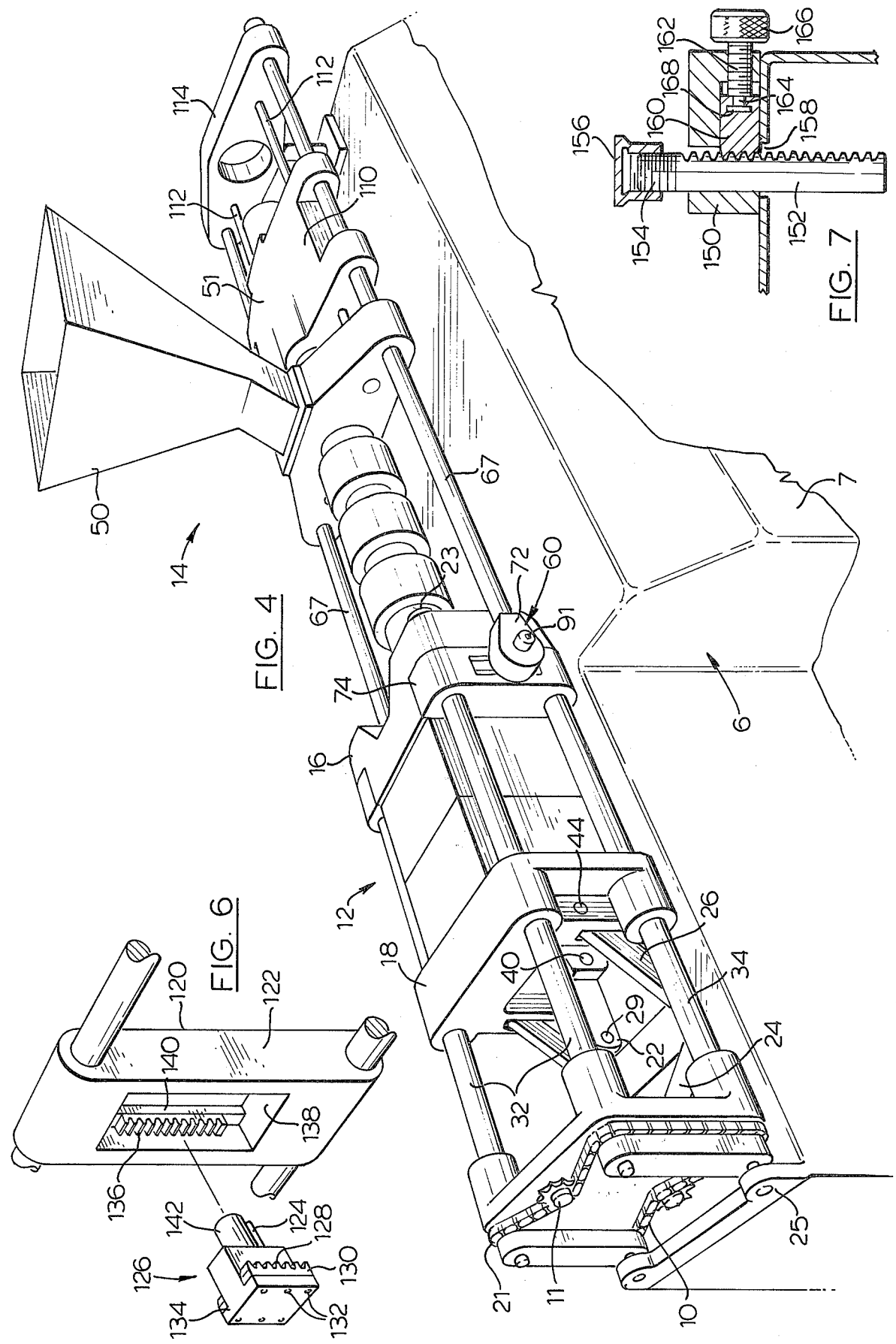

INJECTION MOULDING MACHINE

BACKGROUND OF THE INVENTION

This invention relates to injection moulding machines and, in particular, relates to an improved injection moulding machine having a fixed mould clamping assembly and an injection assembly pivotally mounted on said mould clamping assembly.

Injection moulding machines having separate mould clamping and injection assemblies are known to employ a pivotal connection for varying the operative positions of the assemblies once the assemblies have been fixedly joined together. For example, U.S. Pat. No. 3,086,244 teaches the detachment of machine component parts and re-assembly of parts into a desired configuration, i.e. longitudinal or right-angled configuration, and pivotal movement of the resulting rigid unitary assembly into a desired working position. U.S. Pat. No. 3,564,658 teaches a pivotal movement of mould clamping means of at least 90° on a support base and coaxial securement of injection means to said mould clamping means with provision for the connection of additional injection means to the mould clamping means.

It is a principal object of the present invention to provide an improved injection moulding machine permitting angular adjustment of 90° of an injection assembly pivotally connected to and supported by a fixed horizontal mould clamping assembly with provision for vertical adjustment of the injection assembly pivotal connection relative to the mould clamping assembly for flexibility of mould design.

It is another object of the present invention to provide an improved injection moulding machine which is simple in construction, positive in adjustment and substantially troublefree in operation.

STATEMENT OF THE INVENTION

In general, my improved injection moulding machine comprises a supporting frame, a mould clamping assembly mounted on said frame, an injection assembly, means for pivotally securing said injection assembly to said mould clamping assembly for angular movement of said injection assembly relative to the mould clamping assembly through 90°, and means for vertically adjusting the pivotal securing means for vertical adjustment of the injection assembly relative to the mould clamping assembly when said assemblies are arranged in parallel horizontal alignment and for axially adjusting said injection assembly vertically relative to the mould clamping assembly when said assemblies are arranged at right angles to each other.

BRIEF DESCRIPTION OF THE DRAWING

The foregoing and other objects of the invention, and the manner in which they can be attained, will become apparent from the following detailed description of the invention taken in conjunction with the attached drawings, in which:

FIG. 1 is a side elevation of the injection moulding machine of the present invention showing two operational configurations of the machine with axial alignment of the injection assembly with the mould clamping assembly shown by the injection assembly in solid lines and a right-angled disposition of the injection assembly relative to the mould clamping assembly shown by the injection assembly in broken lines;

FIG. 2 is an exploded perspective view of an embodiment of pivotal connecting means of the invention;

FIG. 3 is a transverse section of the pivotal connecting means shown in FIG. 2;

FIG. 4 is a perspective view of the injection moulding machine of the present invention;

FIG. 5, located with FIGS. 1 and 2, is a side elevation of an embodiment of injection assembly end support;

FIG. 6 is a perspective view of another embodiment of pivotal connecting means of the invention; and FIG. 7 is a side elevation, partly in section, of another embodiment of injection assembly end support.

DESCRIPTION OF THE PREFERRED EMBODIMENT

With particular reference now to FIGS. 1 and 4, there is shown a rigid machine frame 6 having side and end walls 7 and 8 with internal reinforcement, not shown, for supporting a mould clamping assembly designated generally by numeral 12 and a co-operating injection assembly designated generally by numeral 14.

Mould clamping assembly 12 comprises opposed mould clamping platens for holding mould components in a closed position during moulding and in a spaced-apart open position for the ejection of moulded articles. The moulding platens consist of a fixed platen 16 rigidly secured to frame 6 and a moveable moulding platen 18 slidably mounted on a pair of parallel upper tie bars 32 and a pair of parallel lower tie bars 34 for reciprocal travel thereon. The opposed pairs of tie bars 32, 34 are rigidly secured a spaced distance apart at one end to fixed platen 16 by nuts 23 and at the other end to platen casting 19 by sprockets 21 journaled into platen casting 19 and threaded onto bars 32, 34. Endless chain 10 operatively connects sprockets 21 to drive sprocket 11 which can be selectively rotated to move sprockets 21 in unison for slidable adjustment of platen casting 19 on tie bars 32, 34. Tie bars 34 are slidably mounted in brackets 23 supported on frame 6 to permit compensation for change in length of the tie bars during operation.

Platen casting 19 is operatively connected to moveable platen 18 by a toggle mechanism consisting of pairs of links 20, 22 pivotally connected to each other at their inner ends by pin 29, which constitutes a toggle junction, and connected at their opposite ends to platen casting 19 and moveable platen 18 by pins 38, 40 respectively. Common pin 29 constituting the aforesaid toggle junction is secured to the free end of piston rod 28 which is adapted to reciprocate vertically from double-acting hydraulic cylinder 30 which is connected to and supported by platen casting 19 and moveable platen 18 by means of support arms 24, 26 through pivotal connections defined by connecting pins 41, 42, 44 and 46, as illustrated.

The extension of piston rod 28 from cylinder 30 causes links 20, 22 to assume the aligned position shown in FIG. 1 with moveable platen 18 moved to its closed position to the right, as viewed in FIGS. 1 and 4. It will be evident that the retraction of piston rod 28 into cylinder 30 will result in toggle junction 29 of links 20, 22 being depressed downwardly such that moveable platen 18 is guided to the left to its open position. Hydraulic cylinder 30 is of a double-acting type well known in the art for positively extending and retracting piston rod 28.

Injection assembly 14 is of a known type consisting of a feed hopper or granule container 50 and an in-line screw injector 51 for charging molten plastics under high pressure and temperature to a mould positioned in clamp assembly 12. Injection assembly 14 is secured to the mould clamping assembly at its discharge end by pivotal connection means 60 and is supported laterally at its opposite end, when in a horizontal position as shown by solid lines in FIG. 1, by for example a single point support such as shown in detail in FIG. 5 or a pair of rack and pinion assemblies 64, 66 secured to longitudinal tie bars 67 extending the length of the injection assembly, as shown by lower broken lines in FIG. 1. Rack and pinion assemblies 64,66 would be actuated by rod 68 journalled in frame 6 and driven by crank 70. The said single-point support shown in FIG. 5 comprises a set collar 99 secured to an upper corner of frame 6 by welding and adapted to slidably receive vertically disposed rod 94 in opening 96. Rod 94 can be vertically adjusted to a position determined and locked by engagement of set-bolt 98 passing through set collar 99 into engagement with one of three peripheral grooves 100 formed in the set-bolt. The end of injection assembly 14 rests on cap 102 which is threaded onto the upper end of rod 94 for final adjustment of the height of the said end of assembly 14.

Pivotal connection 60, positioned on each side of fixed platen 16, consists of a pair of pivot members 72 to which tie bars 67 are joined by a threaded connection. Each of members 72 is adapted to bear on location plates 73 mounted on cross-head 74 by set screws 75 for pivotal abutment thereon and to receive in arcuate recess 76 dowel 78 projecting from pivot block 80 which is slidably fitted within rectangular opening 82 formed in cross-head 74. Pivot block 80 has a pair of abutments 84 adapted to be received within mating recesses 86 formed in the sides of opening 82 by location plates 73 whereby the block 80 can be adjustably positioned within opening 82 to a desired height. Cylindrical projection 88 extending from pivot block 80 is adapted to be received within mating opening 90 in member 72 and the component parts secured together by bolt 91 threaded into pivot block 80 such that tie bars 67 can be positioned at one of the plurality of height adjustments, for example one of three adjustments shown, provided by recesses 86 co-operating with abutments 84.

Injection assembly 14 can be pivoted through 90°, as limited by the travel of dowel 78 within arcuate recess 76 of each of members 72, from the horizontal position described above to the vertical position shown by the broken lines in FIG. 1, and frictionally locked in the desired position by tightening of bolts 91. A pair of double-acting hydraulically-actuated traversing cylinders, contained within housing 110 of FIG. 4, is mounted on the injection assembly with piston rods 112 extending therefrom secured to stationary cross-head 114 whereby the injection assembly can be retracted on tie bars 67 such that the injection nozzle, not shown, will clear fixed platen 16 during pivotal movement of the injection assembly above pivotal connection 60. Injection assembly 14 is shown in its vertical position to be advanced to the left. Set screws (not shown) adapted to seat against tie rods 32,34 in threaded openings 33,35 respectively (FIG. 2) are released once the injection assembly 14 is vertically disposed and cross-heads 74 slid on tie rods 32,34 to a desired position and the set screws retightened.

FIG. 6 illustrates another embodiment of pivotal connection and FIG. 7 illustrates a corresponding single-point support. This embodiment of pivotal connection, secured to each side of fixed platen 16, comprises a cross-head 122 adapted to receive a pivot member 72, shown most clearly in FIG. 4, on face 120. Pivot block 126, slidably fitted for vertical movement in opening 138 formed in cross-head 122, has a dowel projection 124 and cylindrical projection 142 for extension into mating openings in pivot member 72 and securement together by bolt 91 as shown in FIG. 2. Pivot block 126 has vertical shoulders 134 with rack sections 130 secured thereto by set screws 132 such that teeth 128 project forwardly for engagement with mating teeth 136 formed on vertical shouldlers 140 formed on the sides of the opening 138 of cross-head 122. Block 126 can thus be adjusted vertically within opening 138 to one of a plurality of positions.

The end support shown in FIG. 7 comprises a set collar 150 secured to the frame such as by welding and adapted to receive vertically disposed toothed rack 152 in opening 158. Rack 152 can be vertically adjusted to a desired position corresponding to the height of pivot block 126 of FIG. 6 and locked in that position by engagement of mating rack section 160 therewith. A threaded rod 162 secured to section 160 by threaded onto the upper end 154 of rack 152 for final adjustment of the height of the support assembly.

It will be evident that vertical adjustment of pivotal connection 60 for height adjustment of the longitudinal axis of injection assembly 14 while in a horizontal position, relative to the longitudinal axis of the mould clamping assembly 12, will determine the height of the injection assembly relative to the mould. This adjustment provides for greater flexibility in mould design by permitting more latitude in ingate height. Vertical adjustment of pivotal connection 60 for vertical axial adjustment of the longitudinal axis of the injection assembly 14 while in a vertical position, for split line injection, provides the important advantage of permitting the use of oversize moulds.

I claim:
1. An injection moulding machine comprising a frame, a mould clamping assembly rigidly mounted on said frame, an injection assembly, means for pivotally securing one end of said injection assembly for angular movement of said injection assembly relative to the mould clamping assembly through 90°, and means for vertically adjusting the pivotal securing means for lateral adjustment of the longitudinal axis of the injection assembly relative to the mould clamping assembly when said assemblies are arranged in parallel alignment and for axially adjusting the injection assembly along its longitudinal axis relative to the mould clamping assembly when said assemblies are arranged at right angles to each other.

2. An injection moulding machine as claimed in claim 1, in which said vertical adjusting means for laterally adjusting the longitudinal axis of said injection assembly relative to the mould clamping assembly includes locking means for positioning said pivotal means at one of a plurality of vertical heights relative to said mould clamping assembly.

3. An injection moulding machine as claimed in claim 2, in which said pivotal means are mounted on the mould clamping assembly.

4. An injection moulding machine as claimed in claim 2, in which lateral adjusting support means are provided on said machine frame for supporting an end of the injection assembly remote from the pivotally supported end when the mould clamping assembly and injection assembly are arranged in parallel alignment.

5. An injection moulding machine as claimed in claim 3 in which said pivotal means comprises a pair of spaced apart pivot members rigidly secured to the injection assembly and means for securing said pivot members one on each side of the mould clamping assembly, and detent means formed on said mould clamping assembly for interaction with said pivot members for restricting the angular travel of the injection assembly relative to the mould clamping assembly to 90°.

6. An injection moulding machine as claimed in claim 5 in which said pivotal means comprises a pair of pivot blocks mounted one on each side of the mould clamping assembly each having a cylindrical projection extending therefrom adapted to be received in a mating opening formed in the corresponding pivot member, and a dowel member projecting from each pivot block for insertion in an arcuate recess formed in the corresponding pivot member whereby the pivot member can rotate through a predetermined angle on the cylindrical projection as determined by the length of the arcuate recess.

7. An injection moulding machine as claimed in claim 6 in which each said pivot block is slidably mounted in a recess formed in the mould clamping assembly for vertical adjustment therein.

* * * * *